Dec. 14, 1948.  G. B. STARIE  2,456,463
MOTOR PROTECTIVE DEVICE
Filed Nov. 23, 1943
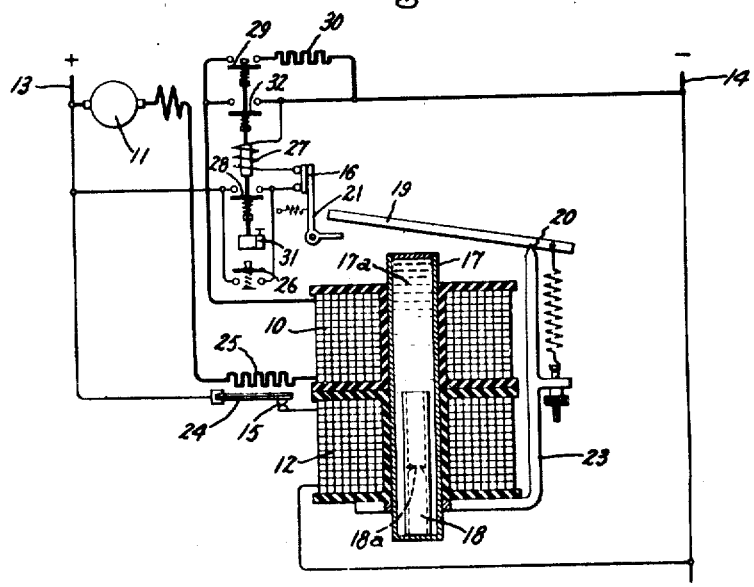
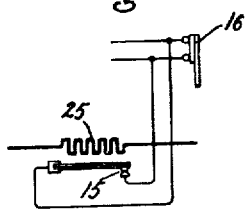
Inventor:
George B. Starie,
by Harry E. Dunham
His Attorney.

Patented Dec. 14, 1948

2,456,463

UNITED STATES PATENT OFFICE 2,456,463

MOTOR PROTECTIVE DEVICE

George B. Starie, Schenectady, N. Y., assignor to General Electric Company, a corporation of New York Application November 23, 1943, Serial No. 511,488

8 Claims. (Cl. 175—294)

My invention relates to motor protective devices, more particularly to devices which are responsive to the current in the motor circuit, and has for its object a simple and reliable device for deenergizing the motor when the motor is heated by overload to a predetermined maximum permissible temperature, while at the same time providing for continued but intermittent operation of the motor to take care of emergency load conditions.

My invention is especially useful in the protection of steel mill type motors operating auxiliary machinery such as tables, screw-downs, side guards, etc., and which start, operate, stop, and reverse repeatedly after short time intervals, even several times a minute. These mill motors operate on a duty cycle of, for example, 25 per cent, 33 per cent, or 50 per cent time of operation, repeated continuously. For example, a motor may accelerate in two seconds, run two seconds, slow down and stop in two seconds, and be deenergized six seconds. If this cycle were repeated steadily, the motor would operate five times a minute.

Such a motor, however, may be operated at its maximum permissible operating temperature or a temperature above this permissible temperature for very considerable periods of time without materially damaging the motor and shortening its useful life. Frequently the importance of continuing operation of the apparatus outweighs the possible damage to the motor and, under such conditions, it is desirable to continue the operation of the motor even though it is operating at an excessively high temperature.

A further object of my invention is to provide protective means for the motor which operates to deenergize the motor when it has been heated to its maximum permissible temperature and thus permits the motor to operate for the longest possible time under both light overload and extremely heavy overload conditions, while at the same time providing for continued operation of the motor with constant and effective warning to the operator of its overheated condition.

Various load or current responsive devices have been provided for the protection of electric motors. Perhaps one of the most satisfactory devices is the current responsive thermal time device which is heated by the motor current at approximately the same proportionate rate as the motor itself.

While giving adequate motor protection, however, this relay has the inherent handicap, since its thermal characteristics are the same as the motor, of cooling at the same slow rate as the motor. Thus the relay, when it once operates to deenergize the motor, prevents restarting of the motor until the relay, and likewise the motor, has cooled to some predetermined low temperature at which the relay permits the restarting of the motor. Thus the motor, when shut down by such a relay, often cannot be restarted again until it has cooled for an interval of ten or fifteen minutes. Loss of production for this period of time may frequently outweigh any consideration due the motor although at the same time the positive protection afforded by a relay, as distinguished from an alarm only, is desirable.

In carrying out my invention in one form, I provide a current responsive protective device having the characteristics of instantaneous operation under short-circuit conditions and time thermal operation in response to overloads, together with an inverse time response to the overload which is normally disabled by the thermal device but rendered effective upon operation of the thermal device. This inverse time device, however, provides for instantaneous reset and for restarting of the motor, if desired, without waiting for the thermal device to cool. Thus in emergencies operation of the motor can be continued by restarting it each time it is deenergized by the inverse time device, the repeated restarting being a warning that the motor may be damaged.

For a more complete understanding of my invention, reference should be had to the accompanying drawing, Fig. 1 of which is a diagrammatic view showing a motor protective device embodying my invention; while Fig. 2 is a fragmentary view showing a modified form of my invention.

Referring to the drawing, in one form of my invention I provide a series coil 10 which, as shown, is connected directly in circuit with the motor 11, and a shunt coil 12 which is electromagnetically associated with the series coil 10 and energized from the supply mains 13 and 14 through a thermostatically operated switch 15. The switch 15 is normally closed for energization of the coil 12, and the coil 12 is connected to the circuit so as to oppose electromagnetically the coil 10 and thereby disable the coil and prevent the opening of the inverse time switch 16 by the coil 10 for deenergization of the motor.

As shown, the coils 10 and 12 are mounted on a hollow magnet core 17 filled with a suitable damping liquid 17a. Inside this core 17 is a movable armature member 18 of magnetic material considerably smaller than the core 17 so that, as it is pulled upward, the liquid 17a can escape past its sides or through suitable ports. Preferably, the core 17 and the armature 18 are cylindrical in form. The liquid, however, damps the movement of the armature 18 and gives the armature an inverse time characteristic with respect to the current in the motor circuit and the series coil 10. Thus the series coil 10 and its armature in the switch 16 constitute an inverse time relay which normally is disabled by the coil 12. When the armature has been lifted to its upper position, the magnetic flux of the coil 10 is increased sufficiently to attract the pivoted armature 19, moving it downward about its pivot 20 into engagement with the upper end of the core 17. The left-hand end of the armature 19, in moving downward, engages the bell crank arm 21, moving it clockwise and thereby opening the switch 16 for deenergization of the motor. The coils are provided with an additional magnetic flux core member 23.

The switch 15 is shown as operated by a bimetallic strip thermostat 24 having one end fixed and its other end moveable in response to changes in temperature and carrying one of the contacts of the switch 15. This thermostat is heated by a resistance heater 25 connected in the motor circuit. The heater 25 and the thermostat 24 are preferably so arranged and so associated with each other that the thermostat 24 is heated at proportionately the same rate as the motor so that the thermostat is heated to a temperature sufficient to cause it to open the switch 15 at substantially the same time that the motor 11 is heated to its maximum permissible operating temperature. This relation holds good irrespective of whether the motor is subjected to a succession of high intermittent overloads, or to a steady load slightly in excess of its continuous rating.

In other words, the thermostat 24, the resistance heater 25, and any suitable heat muffling parts (not shown) which may be used with them constitute a thermal time delay device which has substantially the same temperature characteristics as the motor and which substantially duplicates the temperature conditions in the motor. It will be understood, however, that the actual temperature of the thermostat 24 may and probably will be different from the temperature of the motor.

In the operation of the device, the motor is started by closing a push button switch 26 for energization of the coil 27 through the switch 16 from the supply mains 13 and 14. The coil 27 picks up its armature and closes a holding interlock switch 28 which short-circuits the push button 26 and a motor switch 29 which connects the motor across the supply mains in series with the starting resistance 30. After a predetermined time interval determined by a suitable timing device 31, the main switch 32 closes thereby connecting the motor directly across the supply mains. It will be understood that this starting mechanism for the motor is illustrated diagrammatically. Any suitable starting system may be used in which a switch 16 is included to maintain the motor switch closed.

As long as the switch 15 remains closed, whereby the shunt coil 12 is energized, the series coil 10 is sufficiently neutralized and thereby disabled by the shunt coil 12 to prevent lifting of the slidable armature 18. This is true for all values of motor overload. In the event of a short circuit in the motor circuit, however, the series coil magnetizes the core 17 sufficiently to attract the armature 18 at once and open the switch 16 for deenergization of the motor even though the shunt coil 12 remains energized.

In the event of an overload on the motor, the thermostat 24 is heated and opens the switch 15 for deenergization of the shunt coil at substantially the time that the motor reaches the maximum temperature which it can safely withstand indefinitely without damage to it from overheating. Thereupon the series coil pulls the armature 18 upward and after a predetermined time interval which is inversely dependent upon the current and which is selected to be relatively short as compared with the time required to heat the thermostat, such as one second, thirty seconds or a minute, the armature 18 reaches the top of the core 17 and the armature 19 is attracted for deenergization of the motor. When the motor is deenergized, however, the armature 18 immediately falls back to its lowermost position shown in the drawing. This return movement of the armature is accelerated and preferably made substantially instantaneous after deenergization of the series coil by providing a by pass valve for additional flow of the liquid 17 past the armature 18. For example, the armature 18 may be tubular as shown and provided with an internal valve 18a which opens to allow the armature to drop substantially instantaneously to its lowermost position when the motor circuit is opened by the switch 32.

The thermal time delay device constituted by the thermostat 24 and the resistance heater 25, however, cools slowly at substantially the same proportionate rate as the motor. Consequently, this device may require a cooling time of from ten to fifteen minutes to a normal motor temperature for reclosing of the switch 15 and reenergization of the shunt coil.

However, the motor can be immediately restarted as any intermittently rated motor operating on a duty cycle would be by repeatedly closing the push button 26, although the motor will operate each time for only the short interval of time required for the inverse time operated armature 18 to move to its upper position and attract the armature 19 which time, as previously stated, may be one second or thirty seconds. Thus under emergency conditions of operation where it is desired to continue operation of the motor, even at the risk of damage to the motor, the motor can be operated by repeatedly restarting it after it is stopped. This annoyance to the operator of repeatedly restarting the motor, however, is a constant warning to him that the motor is overloaded and may be damaged.

I contemplate that various arrangements of current responsive and inverse time devices will be used in carrying out my invention. For example, as shown in Fig. 2, the current responsive device may be arranged with the switch 15 connected across, i. e. in parallel with the switch 16, no coil 12 being used. In such case, the inverse time relay will operate repeatedly during the duty cycle under overload conditions to open its switch 16 while the thermostat is being heated but without deenergizing the coil 27 since the switch 15 is in parallel with the switch 16. When the switch 15 is opened, however, the inverse time relay becomes effective as described.

While I have shown a particular embodiment of my invention, it will be understood, of course, that I do not wish to be limited thereto, since many modifications may be made, and I therefore contemplate by the appended claims to cover any such modifications as fall within the true spirit and scope of my invention.

What I claim as new and desire to secure by Letters Patent of the United States is:

1. A protective device for an electric motor comprising an inverse time motor current responsive relay for controlling the circuit of the motor so as to deenergize the motor after a time interval in the event of an excessive current in the motor circuit, said inverse time relay being arranged to reset substantially instantaneously after deenergization of the motor, and motor current responsive means for normally rendering said relay ineffective arranged to be heated at a rate substantially proportional to the rate of heating of the motor thereby when the motor is heated substantially to a predetermined temperature to render said relay effective to deenergize said motor after a time interval, said current responsive means being arranged to cool at substantially the same rate as the motor, thereby to maintain said relay effective to prevent continuous operation of the motor until the motor has cooled to a predetermined temperature but said relay providing for repeated starting and running of the motor under excessive current conditions until deenergized by said relay during the time that said current responsive means is cooling to said predetermined temperature.

2. A protective device for an electric motor comprising a line switch for connection in the circuit of the motor, motor current responsive time delay means for effecting opening said line switch after a time interval in response to an excessive current in the circuit of the motor, switch means for normally rendering said current responsive means ineffective to open said line switch, temperature responsive means for controlling said switch means to render said current responsive means effective, means for heating said temperature responsive means at a rate substantially proportional to the rate of heating of the motor thereby when said motor is heated substantially to a predetermined high temperature to cause said temperature responsive means to make said current responsive means effective to operate said line switch after a time interval for deenergization of the motor, said motor current responsive means having a substantially instantaneous reset characteristic, whereby said motor may be repeatedly operated under excessive current conditions within the limits of said time intervals and without reset of said temperature responsive means.

3. A protective device for an electric motor comprising a motor switch for connection in the circuit of the motor, motor current responsive time delay means for effecting the opening of said switch after a time interval in response to an excessive current in the circuit of the motor, said time delay means being arranged to reset substantially instantaneously after deenergization of the motor thereby to provide for immediate restarting of the motor and operation of the motor under excessive current conditions until it is again deenergized by said time delay means after a time interval, a second switch normally closed to prevent the opening of said motor switch by said current responsive means, temperature responsive means for opening said second switch when said temperature responsive means is heated to a predetermined temperature, means for heating said temperature responsive means at a rate substantially proportional to the rate of heating of the motor thereby when the motor is heated substantially to a predetermined high temperature responsive means to open said second switch and make said inverse time means effective to open said motor switch after a time interval for deenergization of the motor.

4. A protective device for an electric motor comprising a current coil, connections for connecting said current coil in the circuit of the motor, switching means in the circuit of the motor, time delay means operated by said current coil for effecting the operation of said switching means to open the circuit of the motor after a time interval, said time delay means being constructed and arranged to reset substantially instantaneously after deenergization of the motor thereby to provide for the immediate restarting of the motor and operation of the motor until it is again deenergized by said time delay means after a time interval, a voltage coil electromagnetically associated with said current coil, connections for energizing said voltage coil so that said voltage coil electromagnetically opposes said current coil thereby to prevent operation of said time delay means by said current coil, temperature responsive switching means in the circuit of said voltage coil, means for heating said temperature responsive means at a rate substantially proportional to the rate of heating of the motor so that when said motor is heated substantially to a predetermined high temperature, said temperature responsive switching means operates to deenergize said voltage coil whereupon said current coil operates said time delay means to effect the opening of the circuit of the motor, said temperature responsive switch means being arranged to cool at substantially the same rate as the motor and said time delay means by resetting providing for repeated starting of the motor during the time that said temperature responsive switch means is cooling.

5. A protective device for an electric motor comprising a normally open starting switch in the circuit of the motor, means for effecting the closure of said switch, a trip member biased to a predetermined position and movable against its bias to effect the opening of said switch, a current coil in the circuit of the motor, instantaneously resetting time delay means operated by said current coil for operating said trip member to open said switch, a second coil electromagnetically associated with said current coil so as to prevent operation of said trip member by said current coil, a normally closed thermally responsive switch in circuit with said second coil, means responsive to the current in the circuit of the motor for heating said thermally operated switch under overload conditions to deenergize said second coil whereupon said current coil operates said trip member after a time interval to open said switch for deenergization of the motor, said thermally responsive switch being arranged to reclose after cooling for a predetermined time interval.

6. A protective device for an electric motor comprising a normally open starting switch in the circuit of the motor, manually operated means for effecting the closure of said switch, a trip member biased to a predetermined position to maintain said switch closed and movable against its bias to effect the opening of said switch, a current coil in the circuit of the motor, time delay means operated by said current coil for operating said trip member to open said switch, a voltage coil electromagnetically associated with said current coil so as to oppose said current coil and prevent operation of said trip member by said current coil under normal and overload motor operating conditions, a normally closed thermally responsive switch in circuit with said voltage coil, means responsive to the current in the circuit of the motor for heating said thermally responsive switch at a rate proportional to the rate of heating of the motor so that under overload conditions said thermally responsive switch is opened to deenergize said voltage coil at substantially the same time that the temperature of the motor reaches a predetermined maximum value, whereupon said current coil operates said trip member after a predetermined time interval to open said switch for deenergization of the motor, said time delay means being arranged to reset substantially instantaneously after deenergization of the motor so that said starting switch can be reclosed immediately by said manual means for operation of the motor for a limited time interval.

7. A protective device for an electric motor comprising a normally open starting switch in the circuit of the motor, an operating coil for said switch, a manually operated control switch in circuit with said coil operable to energize said coil for closure of said starting switch, a normally closed trip switch in circuit with said coil, a current coil connected in circuit with the motor, time delay means operated by said current coil for opening said trip switch to deenergize said coil, a voltage coil electromagnetically associated with said current coil so as to oppose said current coil and prevent operation of said time delay means by said current coil under normal and overload motor conditions, a normally closed thermally operated switch in circuit with said voltage coil, means responsive to the current in the circuit of the motor for heating said thermally operated switch at a rate proportional to the rate of heating of the motor so that under overload conditions said thermally operated switch is opened to deenergize said voltage coil at substantially the same time that the temperature of the motor reaches a predetermined maximum value, whereupon said current coil operates said time delay means to open said trip switch for deenergization of the motor, said time delay means being arranged to reset substantially instantaneously after deenergization of the motor so that said starting switch can be reclosed immediately for restarting the motor and operation of the motor for a limited time interval before said thermally operated switch has cooled and reclosed.

8. A protective device for an electric motor comprising a biased open starting switch for connection in the circuit of the motor, a coil for closing said switch, a biased closed control switch in circuit with said coil, a manually operated biased open switch for closing the circuit of said coil through said control switch for closure of said starting switch, interlock switch means operated by said coil for maintaining said coil circuit closed through said control switch after said control switch has been closed by said manually operated switch, an inverse time relay arranged to be connected in circuit with the motor provided with a member moved in response to the motor current to a predetermined position after a time interval thereby to effect the opening of said control switch for deenergization of said motor, said member being arranged to return to its starting position substantially instantaneously after the deenergization of the motor thereby to provide for the immediate restarting of the motor by said manually operated switch for operation until said member opens said control switch, disabling means for preventing movement of said member in response to motor current, and thermal motor current responsive means for controlling said disabling means to render said disabling means effective until said current responsive means is heated to a predetermined temperature whereupon said member of said inverse time relay moves to open said control switch.

GEORGE B. STARIE.

REFERENCES CITED

The following references are of record in the file of this patent:

UNITED STATES PATENTS

| Number | Name | Date |
| --- | --- | --- |
| 1,154,359 | Basch | Sept. 21, 1915 |
| 1,700,661 | Appelberg | Jan. 29, 1929 |
| 2,056,040 | Dozier | Sept. 29, 1936 |
| 2,249,813 | Dyer | July 22, 1941 |
| 2,361,221 | Ludwig | Oct. 24, 1944 |